US010038463B1

(12) United States Patent
Mundarath et al.

(10) Patent No.: US 10,038,463 B1
(45) Date of Patent: Jul. 31, 2018

(54) SYSTEMS AND METHODS FOR GAIN ESTIMATION AND SYNCHRONIZATION IN ADAPTIVE FILTERS

(71) Applicant: NXP USA, Inc., Austin, TX (US)

(72) Inventors: Jayakrishnan Cheriyath Mundarath, Austin, TX (US); Zhiyu Cheng, Austin, TX (US); Leo Dehner, Austin, TX (US)

(73) Assignee: NXP USA, Inc., Austin, TX (US)

( * ) Notice: Subject to any disclaimer, the term of this patent is extended or adjusted under 35 U.S.C. 154(b) by 0 days.

(21) Appl. No.: 15/811,750

(22) Filed: Nov. 14, 2017

(51) Int. Cl.

| | |
|---|---|
| ***H04K 1/02*** | (2006.01) |
| ***H04B 1/04*** | (2006.01) |
| ***H04L 25/03*** | (2006.01) |
| ***H04L 7/00*** | (2006.01) |

(52) U.S. Cl.
CPC ......... *H04B 1/0475* (2013.01); *H04L 7/0091* (2013.01); *H04L 25/03063* (2013.01); *H04B 2001/0425* (2013.01)

(58) Field of Classification Search
CPC ........... H03F 1/3247; H03F 2201/3233; H03F 1/3241; H03F 2200/451; H03F 2200/129; H04B 1/0475; H04B 2001/0425; H04B 2001/0433; H04B 1/0067; H04B 1/525; H04L 27/368; H04L 2025/03681; Y02D 70/1262
See application file for complete search history.

(56) References Cited

U.S. PATENT DOCUMENTS

2004/0008802 A1 1/2004 Galperin et al.
2012/0154038 A1* 6/2012 Kim ..................... H03F 1/3247 330/149

OTHER PUBLICATIONS

Minn et al., "A combined timing and frequency synchronization and channel estimation for OFDM," in IEEE Transactions on Communications, vol. 54, No. 3, pp. 416-422, Mar. 2006.

* cited by examiner

*Primary Examiner* — Rahel Guarino

(57) ABSTRACT

Digital pre-distortion is performed on a received signal using a set of pre-distortion coefficients to produce a digital pre-distorted signal. The digital pre-distorted signal is converted to an analog signal, which is amplified to produce a transmission output signal. The transmission output signal is converted to a digital feedback signal. A plurality of fractional delay filters is applied to the digital feedback signal to obtain a plurality of fractional delay compensated (FDC) candidates, and gain compensation is applied to each of the plurality of FDC candidates to obtain a plurality of gain and fractional delay compensated (XFT) candidates. The digital pre-distorted signal is used as a reference signal, and the XFT candidates and the reference signal are used to select a selected XFT candidate of the plurality of XFT candidates. The selected XFT candidate is used to generate the set of pre-distortion coefficients.

20 Claims, 3 Drawing Sheets

300

302 FILTER REFERENCE AND FEEDBACK GAIN SIGNALS TO OBTAIN FILTERED SIGNALS XFB AND XREF

304 GENERATE A NUMBER OF FRACTIONAL DELAY FILTERS

306 APPLY FRACTIONAL DELAY FILTERS TO XFB TO OBTAIN FRACTIONAL DELAY COMPENSATED (FDC) CANDIDATES

308 ESTIMATE GAIN COMPENSATION (RECIPROCAL OF α) FOR EACH OF THE FDC CANDIDATES

310 APPLY GAIN COMPENSATION TO EACH OF THE FDC CANDIDATES TO OBTAIN GAIN AND FRACTIONAL DELAY COMPENSATED CANDIDATES (XFT CANDIDATES)

312 CALCULATE DIFFERENCE ERROR METRIC FOR EACH XFT CANDIDATE $d_j = \sum_{i=0}^{MIN} |XFT\,j(i) - XREF\,(i)|^2$ j FROM 1 TO Y 314 SELECT XFT CANDIDATE THAT CORRESPONDS TO MINIMUM DIFFERENCE $d_{MIN}$ 316 PROVIDE XFT CANDIDATE AND XREF CORRESPONDING TO $d_{MIN}$ TO ADAPTATION CIRCUIT

SYSTEMS AND METHODS FOR GAIN ESTIMATION AND SYNCHRONIZATION IN ADAPTIVE FILTERS

BACKGROUND

Field

This disclosure relates generally to adaptive filters, and more specifically, to gain estimation and synchronization in adaptive filters.

Related Art

In the digital front end systems of cellular base stations, a closed-loop adaptive filter is used to automatically adjust the coefficients for the digital pre-distortion signal processing, such that the power ratio of the input and output of the power amplifier (PA) is linearized. In the closed-loop adaptive filter, various adaptive signal processing techniques have been developed to minimize the estimation error. The adaptive signal processing techniques can include synchronizing the reference signal provided to a digital to analog converter (DAC) (whose output is provided as input to the PA) and a feedback signal that is a digital version of the analog output from the PA.

Due to the digital-to-analog and analog-to-digital conversions, a sub-sample delay in the feedback signal may occur. To determine and compensate the sub-sample delay, a fine synchronization algorithm can be used. Time domain fine synchronization algorithms usually work well for wideband signals such as 3×LTE20, 5×LTE20 because the amplitudes of these signals change rapidly, such that a specific delay value and a corresponding index from among a set of compensation values are easy to locate. However, for narrowband signals such as LTE5, LTE1.4, it is much more difficult to find the specific compensation value and its corresponding index due to the fact that these signals are relatively smooth in the time domain. This leads to ambiguity when searching for the matching index.

BRIEF DESCRIPTION OF THE DRAWINGS

The present disclosure is illustrated by way of example and is not limited by the accompanying figures, in which like references indicate similar elements. Elements in the figures are illustrated for simplicity and clarity and have not necessarily been drawn to scale.

DETAILED DESCRIPTION

Embodiments of systems and methods disclosed herein provide combined gain estimation and fine synchronization for front-end processing in digital baseband transmitters. The front-end processing circuits include a sub-sample delay filter, an inner-product processor, a reciprocal unit, a least squares estimator processor, a sum of differences calculator and a minimum search unit. Joint gain estimation and fine synchronization is performed using a low pass filter to filter out the out-of-band noise in the reference signal and feedback signal. A sub-sample delay filter is then used to shift the feedback signal into a group of sub-sample delayed signals, and for each of them, the gain is calculated compared to the reference signal. The gain is then applied to the corresponding sub-sample delayed feedback signal. The difference between the reference signal and each of sub-sample delayed feedback signals is determined, along with a minimum value and its index. The front-end circuit can generate compensation values and corresponding indices for narrowband signals such as LTE 5 and LTE 1.4, among others.

Figure 1:
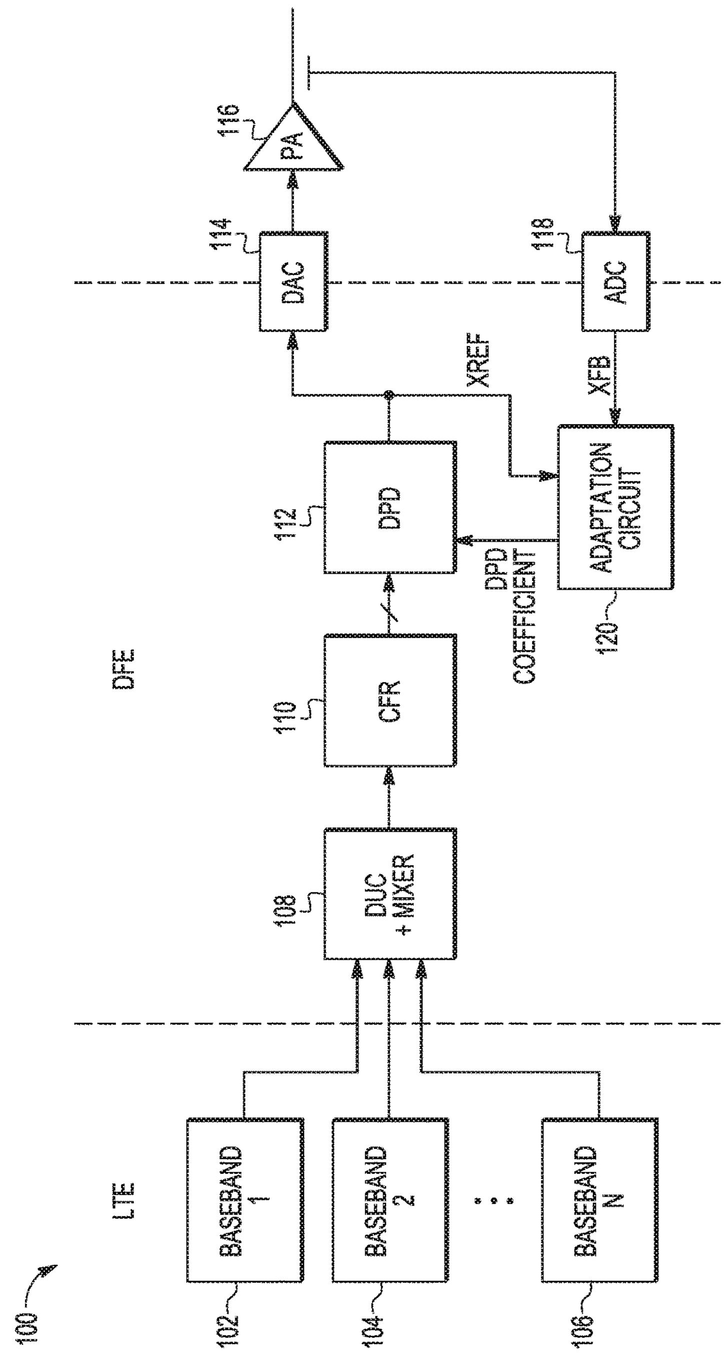
FIG. 1 is a block diagram of a baseband signal processing system in accordance with selected embodiments of the invention.

FIG. 1 is a block diagram of a baseband signal processing transmitter system 100 in accordance with selected embodiments of the invention that includes one or more baseband signal transmitter circuits 102, 104, 106, digital upconverter and mixer circuit 108, crest factor reduction circuit 110, digital pre-distorter circuit 112, digital to analog converter (DAC) circuit 114, power amplifier circuit 116, analog to digital converter (ADC) circuit 118, and adaptation circuit 120. Baseband signal transmitters 102, 104, 106 can be configured to generate signals using different communication protocols. For example, baseband signal transmitter 102 can be configured to generate signals using a Long Term Evolution (LTE) protocol, baseband signal transmitter 104 can be configured to generate signals using a code division multiple access (CDMA) protocol, baseband signal transmitter 106 can be configured to generate signals using a global system for mobile communications (GSM) protocol. Baseband signal transmitter circuits 102, 104, 106 can be configured to use other suitable communication protocols in addition to, or instead of, the communication protocols mentioned. Further, additional baseband signal transmitter circuits can be included in transmitter system 100 along with baseband signal transmitter circuits 102, 104, 106.

Signals from baseband signal transmitter circuits 102, 104, 106 can have different sampling rates. Digital upconverter circuit 108 converts signals with different sampling rates to the same sampling rate and mixes them together to provide a combined signal to crest factor reduction circuit 110. Crest factor reduction circuit 110 keeps the peak value of the signal from upconvert and mixer circuit 108 at a desired ratio to the effective value of the upconverted/mixed signal from upconvert and mixer circuit 108.

Digital pre-distorter circuit 112 provides a reverse model of power amplifier circuit 116 that is configured to help reduce non-linear distortion in the final transmitted signal output from power amplifier circuit 116. Digital pre-distorter circuit 112 receives input from crest factor reduction circuit 110 and pre-distortion coefficient information from adaptation circuit 120. DAC circuit 114 receives a digital pre-distorted signal output, also referred to as reference signal (XREF0), from digital pre-distorter circuit 112, converts the digital pre-distorted signal to an analog pre-distorted signal, and provides the analog pre-distorted signal to power amplifier 116. The output of power amplifier 116 is an analog signal in which non-linear distortions are minimized by the pre-distortion introduced by digital pre-distortion circuit 112. To determine the amount of reverse distortion to be added by digital pre-distortion circuit 112, a portion of the output of power amplifier 116 is converted to a digital signal in ADC circuit 118. The reference signal (XREF0) from digital pre-distortion circuit 112, and the digital power amplifier output signal, also referred to as feedback signal (XFB0), from ADC 118, are provided to adaptation circuit 120. Adaptation circuit 120 determines an amount of "reverse" distortion to be added by digital pre-distortion circuit 112 so that nonlinear distortion in the amplified signal produced by power amplifier circuit 116 will be minimized. The output of adaptation circuit 120 is provided as input to digital pre-distortion circuit 112 in the form of pre-distortion coefficients that are used to determine an amount of pre-distortion to be applied to the signal provided by crest factor reduction circuit 110 based on the difference between the reference signal (XREF0) and the feedback signal (XFB0).

Figure 2:
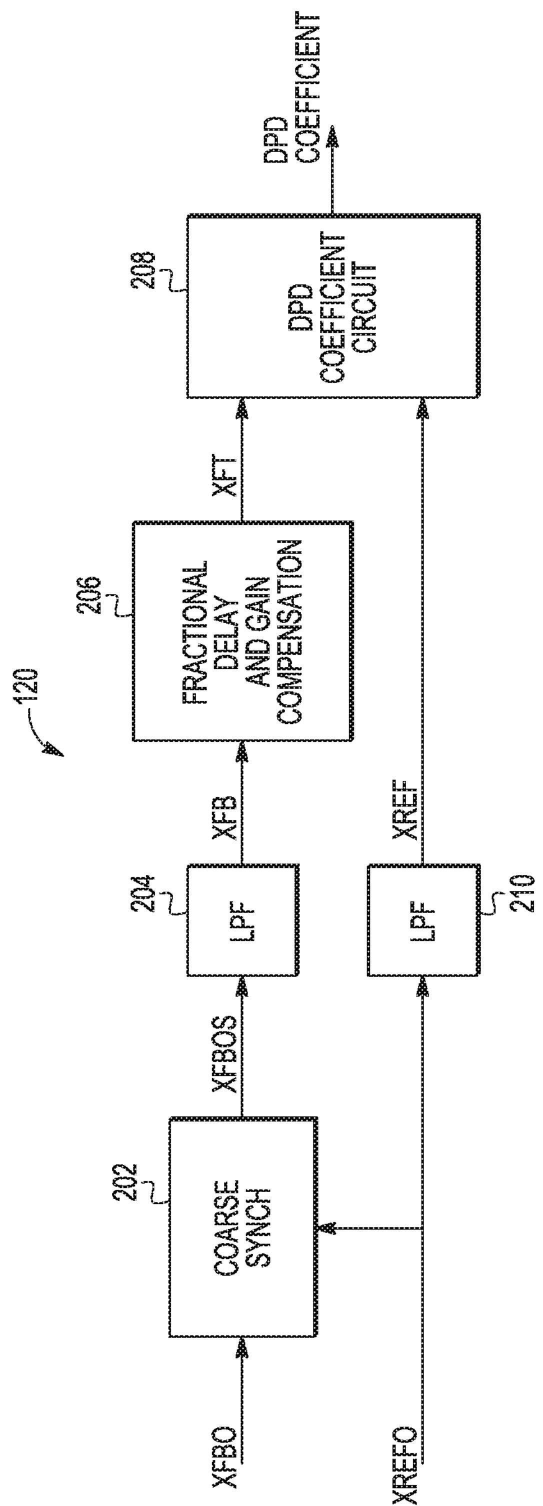
FIG. 2 is a block diagram of an embodiment of an adaptation circuit that can be used in the signal processing system of FIG. 1.

FIG. 2 is a block diagram of an embodiment of an adaptation circuit 120 that can be used in the signal processing system 100 of FIG. 1 that includes coarse synchronization circuit 202, low pass filter circuits 204, 210, fractional delay and gain compensation circuit 206, and digital pre-distortion coefficient circuit 208. Coarse synchronization circuit 202 is configured to receive the reference signal (XREF0) and the feedback signal (XFB0), and to synchronize the reference signal (XREF0) and the feedback signal (XFB0) to a nearest sample. Any suitable synchronization technique can be used such as calculating the cross-correlation profile of different integer sample delayed versions of the feedback signal, XFB0 with the reference signal, XREF0 and by aligning to the sample index corresponding to maximum value of power of this cross-correlation profile.

Low pass filter circuit 204 receives a synchronized feedback signals (XFB0S) from coarse synchronization circuit 202 and allows synchronized feedback signals (XFB0S) with a frequency lower than a specified cutoff frequency to be passed to fractional delay and gain compensation circuit 206. Synchronized feedback signals (XFB0S) with a frequency higher than the specified cutoff frequency are attenuated.

Low pass filter circuit 210 receives the reference signal (XREF0) and allows reference signals (XREF0) with a frequency lower than a specified cutoff frequency to be passed to digital pre-distortion coefficient circuit 208. Reference signals (XREF0) with a frequency higher than the specified cutoff frequency are attenuated.

The cutoff frequency for low pass filters 204, 210 can be chosen to filter out-of-band noise. Note that low pass filters 204, 210 may be variable filters to accommodate transmission of signals in a variable bandwidth.

Fractional delay and gain compensation circuit 206 receives filtered digital feedback signal (XFB) output from low pass filter 204 and applies fractional delay filters to the digital feedback signal to obtain a plurality of fractional delay compensated (FDC) candidates. A sub-sample delay filter can be used to fractionally shift the feedback signal (XFB) into a group of sub-sample delayed signals, and for each of them, a gain is calculated compared to the reference signal (XREF) to generate gain and fractional delay compensated feedback signals (XFT). The sum of the squares of the differences between the reference signal (XREF) and each of sub-sample delayed feedback signals can be calculated, and the minimum value and its index determined, in digital pre-distortion coefficient circuit 208.

Figure 3:
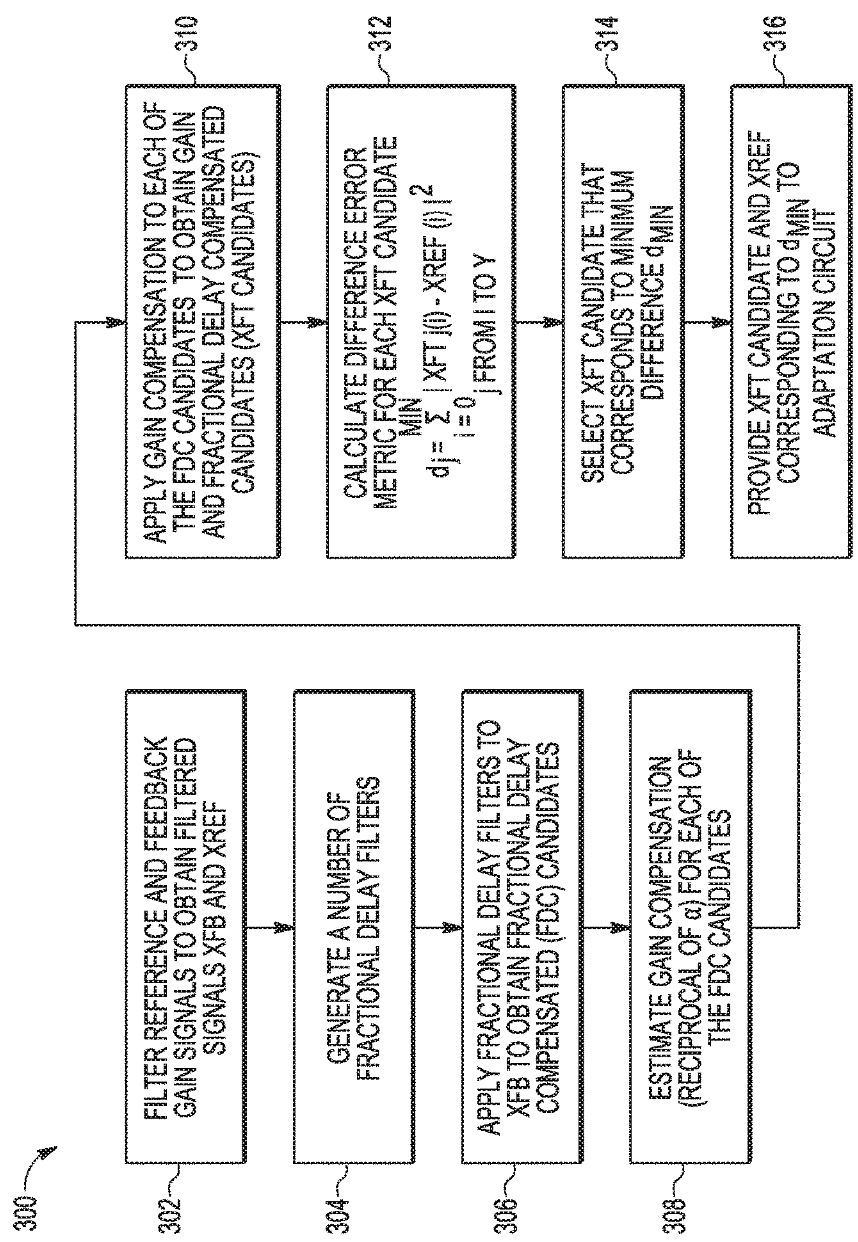
FIG. 3 is a flow diagram of an embodiment of a method that can be performed in the adaptation circuit of FIG. 2.

Referring to FIGS. 2 and 3, FIG. 3 is a flow diagram of an embodiment of a method 300 that can be performed in adaptation circuit 120 of FIG. 2. Process 302 includes filtering feedback and reference gain signals (XFB0 and XREF0) to obtain filtered feedback and reference signals XFB and XREF. For adaptation circuit 206, the following signal model can be used:

$$XFB0=\alpha * XREF0+n$$

where α is the channel gain, and n is the additive white Gaussian noise (AWGN).

The outputs of low pass filters 204, 210 are represented by:

$$XFB=\text{filter}(H,XFB0)$$

$$XREF=\text{filter}(H,XREF0)$$

where H is a low pass filter tap vector.

In process 304, a number of fractional delay filters are generated. In the following example, 128 fractional delay filters are used, however any suitable number of fractional delay filters can be generated. Interpolated filtering corresponding to different fractional delay filters in fractional delay and gain compensation circuit 206 for different time delays can be represented by:

$$F=\begin{bmatrix} h_1^T \\ h_2^T \\ \vdots \\ h_{63}^T \\ h_{64}^T \end{bmatrix}$$

where row vectors of filter taps are represented by $h_i^T$. In process 306, the fractional delay filters are applied to the feedback signal XFB to obtain fractional delay compensated (FDC) candidates. In this example, XFT=F*XFB and represents delays from 1-64 while XFT'=F*XFB' represents delays from −64 to 0. Each column in matrix XFB is a feedback sample vector $x_{fb}$, and similarly for XFB', which is a one column shifted version of XFB.

In process 308, gain compensation values (reciprocal of α) are estimated, as represented by $$\hat{g}_i=\frac{|x_{ref}|^2}{x_{ref}^*\cdot x_{ft,i}} \quad \hat{g}_{i-64}=\frac{|x_{ref}|^2}{x_{ref}^*\cdot x'_{ft,i-64}}$$

where $x_{ft,i}$ is the $i^{th}$ row vector of XFT, i.e., the $i^{th}$ filtered feedback signal XFB, $\hat{g}_i$ is the corresponding estimated gain, and similarly for $x'_{ft,i-64}$.

In process 310, the gain compensation values from process 308 are applied to each of the FDC candidates to obtain a number of gain and fractional delay compensated candidates, as represented by:

$$\tilde{x}_{ft,i}=\hat{g}_i x_{ft,i}, i=1,2,\ldots,64 \quad \tilde{x}'_{ft,i-64}=\hat{g}_{i-64}x'_{ft,i-64}, i=65,66,\ldots,128$$

In process 312, a difference error metric is calculated for all 128 candidates to determine the correct fractionally delayed and gain compensated candidate. The difference error metric is represented by:

$$d_i=|\tilde{x}_{ft,i}-x_{ref}|^2,\ i=1,2,\ldots,64$$

$$d_i=|\tilde{x}'_{ft,i-64}-x_{ref}|^2,\ i=65,66,\ldots,128$$

where $\tilde{x}_{ft,i}$ and $\tilde{x}'_{ft,i-64}$ are filtered, gain adjusted feedback signals.

In process 314, the index of the fractionally delayed and gain compensated candidate signal that minimizes the difference error metric in process 312 is determined, as represented by:

$$\text{index}=\min_i(d_i)$$

$$\text{index}=\text{index}-1$$

In this example, the mapping between the fine index and sub sample delay is shown as follows:

| index | 0 | 1 | . . . | 64 | 65 | . . . | 127 |
|---|---|---|---|---|---|---|---|
| Sub-sample delay | −64/64 | −63/64 | . . . | 0 | 1/64 | . . . | 63/64 |

The fractionally delayed and gain compensated candidate signal, XFBGFDC, corresponding to the index that minimizes the difference error is then provided to DPD coefficient circuit 208, along with the reference signal, XREF, to select digital pre-distortion coefficients to be applied to the output of crest factor reduction circuit 110 by DPD circuit 112 to generate the digital pre-distorted signal in process 316. The digital pre-distorted signal is then converted to an analog signal by DAC 114 and amplified by power amplifier 116.

By now it should be appreciated that the disclosed embodiments can successfully pre-distort narrowband signals such as LTE1.4, LTE5, among others, for both high SNR and low SNR cases so noise added by power amplifier 116 is cancelled. Note, for the low signal-to-noise (SNR) cases, e.g., less than 60 dB, the low pass filters 204, 210 can be used to remove the out-of-band noise, which could otherwise cause interference when the SNR is low.

In some embodiments, a method for controlling digital pre-distortion in transmitter circuit can comprise performing digital pre-distortion by digital pre-distortion circuit (112) on a received signal using a set of pre-distortion coefficients to produce a digital pre-distorted signal, converting (114) the digital pre-distorted signal to an analog signal, amplifying (116) the analog signal to produce a transmission output signal, converting (118) the transmission output signal to a digital feedback signal, and using the digital pre-distorted signal as a reference signal and using the digital feedback signal by adaptation circuit to generate the set of pre-distortion coefficients (120). Generating the set of pre-distortion coefficients can comprise applying (306) a plurality of fractional delay filters to the digital feedback signal to obtain a plurality of fractional delay compensated (FDC) candidates, applying (308) gain compensation to each of the plurality of FDC candidates to obtain a plurality of gain and fractional delay compensated (XFT) candidates, using (312, 314) the XFT candidates and the reference signal to select a selected XFT candidate from the plurality of XFT candidates. The selected XFT candidate along with the reference signal is used to generate the set of pre-distortion coefficients (316, 112).

In another aspect, using the XFT candidates and the reference signal to select a selected XFT candidate can comprise obtaining (312) a difference error metric for each XFT candidate which is based on a difference between each XFT candidate and the reference signal, and selecting (314) a XFT candidate that corresponds to the minimum difference error metric as the selected XFT candidate.

In another aspect, the different error metric for each XFT candidate can be obtained over a predetermined number of samples.

In another aspect, prior to applying the plurality of fraction delay filters to the digital feedback signal, the digital feedback signal and the reference signal can be synchronized (202) to a nearest sample.

In another aspect, each fractional delay filter can attempt to shift and align the digital feedback signal to a fraction of a sample.

In another aspect, prior to applying the plurality of fraction delay filters to the digital feedback signal, a low pass filter (204, 210) can be applied to the reference signal and the digital feedback signal.

In another aspect, the method can further comprise receiving baseband signals at same/different sampling rates from a plurality of baseband circuits (102, 104, 106); upconverting the baseband signals to a uniform sampling rate; and combining (108) the upconverted baseband signals to generate a combined signal, wherein the input signal is based on the combined signal.

In another aspect, each of the plurality of baseband circuits can operate in accordance to a different wireless communication standard.

In another aspect, each baseband signal can have a different frequency.

In another aspect, the plurality of fractional delay filters can be predetermined.

In other embodiments, a transmitter can comprise digital pre-distortion circuit (112) configured to produce a digital pre-distorted signal based on a received signal and a set of pre-distortion coefficients, a digital-to-analog converter (DAC) (114) configured to convert the digital pre-distorted signal to an analog signal, power amplifier circuit (116) configured to amplify the analog signal and provide a transmission output signal, an analog-to-digital converter (ADC) (118) configured to convert the transmission output signal to a digital feedback signal, and adaptation circuit (120) coupled to the digital pre-distortion circuit and configured to receive the digital pre-distorted signal as a reference signal and receive the digital feedback signal. The adaptation circuit can be configured to apply (306) a plurality of fractional delay filters to the digital feedback signal to obtain a plurality of fractional delay compensated (FDC) candidates, apply (308) gain compensation to each of the plurality of FDC candidates to obtain a plurality of gain and fractional delay compensated (XFT) candidates, use (312, 314) the XFT candidates and the reference signal to select a selected XFT candidate of the plurality of XFT candidates, and generate (316, 112) the set of pre-distortion coefficients using the selected XFT candidate.

In another aspect, the adaption circuit can be configured to obtain a difference error metric (312) for each XFT candidate which is based on a difference between each XFT candidate and the reference signal, and select (314) a XFT candidate that corresponds to the minimum difference error metric as the selected XFT candidate.

In another aspect, the different error metric for each XFT candidate can be obtained over a predetermined number of samples.

In another aspect, the adaption circuit can further comprise a coarse synchronization circuit (202) configured to synchronize the digital feedback signal and the reference signal to a nearest sample, wherein each fractional delay filter attempts to synchronize the digital feedback signal to a fraction of a sample.

In another aspect, the transmitter can further comprise a plurality of baseband circuits (102, 104, 106) each configured to generated a baseband signal; and mixer circuit (108) can be configured to combine the baseband signals to generate a combined signal, wherein the received signal is based on the combined signal.

In another aspect, each of the plurality of baseband circuits can operate in accordance to a different wireless communication standard.

In another aspect, the mixer circuit can further comprise a digital up converter (108) configured to convert the plurality of baseband signals to a same sampling rate.

In further embodiments, a transmitter can comprise a plurality of baseband circuits each configured to generated a baseband signal, wherein each baseband signal has a different frequency. Mixer circuit can be configured to combine the baseband signals to generate a combined signal, digital pre-distortion circuit can be configured to produce a digital pre-distorted signal based on the combined signal and a set of pre-distortion coefficients, a digital-to-analog converter (DAC) can be configured to convert the digital pre-distorted signal to an analog signal, and power amplifier circuit can be configured to amplify the analog signal and provide a transmission output signal. An analog-to-digital converter (ADC) can be configured to convert the transmission output signal to a digital feedback signal; and adaptation circuit can be coupled to the digital pre-distortion circuit and configured to receive the digital pre-distorted signal as a reference signal and receive the digital feedback signal. The adaptation circuit can be configured to apply a plurality of fractional delay filters to the digital feedback signal to obtain a plurality of fractional delay compensated (FDC) candidates, apply gain compensation to each of the plurality of FDC candidates to obtain a plurality of gain and fractional delay compensated (XFT) candidates, use the XFT candidates and the reference signal to select a selected XFT candidate of the plurality of XFT candidates, and generate the set of pre-distortion coefficients using the selected XFT candidate.

In another aspect, the adaption circuit can be configured to obtain a difference error metric for each XFT candidate which is based on a difference between each XFT candidate and the reference signal, and select a XFT candidate that corresponds to the minimum difference error metric as the selected XFT candidate.

In another aspect, the adaption circuit can further comprise a coarse synchronization circuit configured to synchronize the digital feedback signal and the reference signal to a nearest sample, wherein each fractional delay filter attempts to synchronize the digital feedback signal to a fraction of a sample.

Because the apparatus implementing the present disclosure is, for the most part, composed of electronic components and circuits known to those skilled in the art, circuit details will not be explained in any greater extent than that considered necessary as illustrated above, for the understanding and appreciation of the underlying concepts of the present disclosure and in order not to obfuscate or distract from the teachings of the present disclosure.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the disclosure described herein are, for example, capable of operation in other orientations than those illustrated or otherwise described herein.

Although the disclosure is described herein with reference to specific embodiments, various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure. Any benefits, advantages, or solutions to problems that are described herein with regard to specific embodiments are not intended to be construed as a critical, required, or essential feature or element of any or all the claims.

The term "coupled," as used herein, is not intended to be limited to a direct coupling or a mechanical coupling.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to disclosures containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A method for controlling digital pre-distortion in transmitter circuit, comprising:

performing digital pre-distortion by digital pre-distortion circuit on an input signal using a set of pre-distortion coefficients to produce a digital pre-distorted signal;

converting the digital pre-distorted signal to an analog signal;

amplifying the analog signal to produce a transmission output signal;

converting a portion of the transmission output signal to a digital feedback signal;

using the digital pre-distorted signal as a reference signal and using the digital feedback signal by adaptation circuit to generate the set of pre-distortion coefficients, wherein generating the set of pre-distortion coefficients comprises:

applying a plurality of fractional delay filters to the digital feedback signal to obtain a plurality of fractional delay compensated (FDC) candidates;

applying gain compensation to each of the plurality of FDC candidates to obtain a plurality of gain and fractional delay compensated (XFT) candidates;

using the XFT candidates and the reference signal to select a selected XFT candidate of the plurality of XFT candidates; and using the selected XFT candidate to generate the set of pre-distortion coefficients.

2. The method of claim 1, wherein using the XFT candidates and the reference signal to select a selected XFT candidate comprises:

obtaining a difference error metric for each XFT candidate which is based on a difference between each XFT candidate and the reference signal;

selecting the XFT candidate that corresponds to a minimum difference error metric as the selected XFT candidate.

3. The method of claim 2, wherein the different error metric for each XFT candidate is obtained over a predetermined number of samples.

4. The method of claim 1, wherein, prior to applying the plurality of fraction delay filters to the digital feedback signal, synchronizing the digital feedback signal and the reference signal to a nearest sample.

5. The method of claim 4, wherein each fractional delay filter attempts to shift and align the digital feedback signal to a fraction of a sample.

6. The method of claim 1, wherein prior to applying the plurality of fraction delay filters to the digital feedback signal, applying a low pass filter to the reference signal and the digital feedback signal.

7. The method of claim 1, further comprising:

receiving baseband signals at same/different sampling rates from a plurality of baseband circuits;

upconverting the baseband signals to a uniform sampling rate; and combining the upconverted baseband signals to generate a combined signal, wherein the received baseband signals are based on the combined signal.

8. The method of claim 7, wherein each of the plurality of baseband circuits operates in accordance to a different wireless communication standard.

9. The method of claim 8, wherein each baseband signal has a different frequency.

10. The method of claim 1, wherein the plurality of fractional delay filters is predetermined.

11. A transmitter comprising:

a digital pre-distortion circuit configured to produce a digital pre-distorted signal based on an input signal and a set of pre-distortion coefficients;

a digital-to-analog converter (DAC) configured to convert the digital pre-distorted signal to an analog signal;

a power amplifier circuit configured to amplify the analog signal and provide a transmission output signal;

an analog-to-digital converter (ADC) configured to convert the transmission output signal to a digital feedback signal; and an adaptation circuit coupled to the digital pre-distortion circuit and configured to receive the digital pre-distorted signal as a reference signal and receive the digital feedback signal, wherein the adaptation circuit is configured to:

apply a plurality of fractional delay filters to the digital feedback signal to obtain a plurality of fractional delay compensated (FDC) candidates;

apply gain compensation to each of the plurality of FDC candidates to obtain a plurality of gain and fractional delay compensated (XFT) candidates;

use the XFT candidates and the reference signal to select a selected XFT candidate of the plurality of XFT candidates; and generate the set of pre-distortion coefficients using the selected XFT candidate.

12. The transmitter of claim 11, wherein the adaption circuit is configured to:

obtain a difference error metric for each XFT candidate which is based on a difference between each XFT candidate and the reference signal;

select a XFT candidate that corresponds to a minimum difference error metric as the selected XFT candidate.

13. The transmitter of claim 12, wherein the different error metric for each XFT candidate is obtained over a predetermined number of samples.

14. The transmitter of claim 11, wherein the adaption circuit further comprises:

a coarse synchronization circuit configured to synchronize the digital feedback signal and the reference signal to a nearest sample, wherein each fractional delay filter attempts to synchronize the digital feedback signal to a fraction of a sample.

15. The transmitter of claim 11, further comprising:

a plurality of baseband circuits each configured to generated a baseband signal; and a mixer circuit configured to combine the baseband signals to generate a combined signal, wherein the baseband signals are based on the combined signal.

16. The transmitter of claim 15, wherein each of the plurality of baseband circuits operates in accordance to a different wireless communication standard.

17. The transmitter of claim 15, wherein the mixer circuit further comprises a digital up converter (108) configured to convert the plurality of baseband signals to a same sampling rate.

18. A transmitter comprising:

a plurality of baseband circuits each configured to generated a baseband signal, wherein each baseband signal has a different frequency; and a mixer circuit configured to combine the baseband signals to generate a combined signal;

a digital pre-distortion circuit configured to produce a digital pre-distorted signal based on the combined signal and a set of pre-distortion coefficients;

a digital-to-analog converter (DAC) configured to convert the digital pre-distorted signal to an analog signal;

a power amplifier circuit configured to amplify the analog signal and provide a transmission output signal;

an analog-to-digital converter (ADC) configured to convert the transmission output signal to a digital feedback signal; and an adaptation circuit coupled to the digital pre-distortion circuit and configured to receive the digital pre-distorted signal as a reference signal and receive the digital feedback signal, wherein the adaptation circuit is configured to:

apply a plurality of fractional delay filters to the digital feedback signal to obtain a plurality of fractional delay compensated (FDC) candidates;

apply gain compensation to each of the plurality of FDC candidates to obtain a plurality of gain and fractional delay compensated (XFT) candidates;

use the XFT candidates and the reference signal to select a selected XFT candidate of the plurality of XFT candidates; and generate the set of pre-distortion coefficients using the selected XFT candidate.

19. The transmitter of claim 18, wherein the adaption circuit is configured to:

obtain a difference error metric for each XFT candidate which is based on a difference between each XFT candidate and the reference signal;

select a XFT candidate that corresponds to a minimum difference error metric as the selected XFT candidate.

20. The transmitter of claim 18, wherein the adaption circuit further comprises:

a coarse synchronization circuit configured to synchronize the digital feedback signal and the reference signal to a nearest sample, wherein each fractional delay filter attempts to synchronize the digital feedback signal to a fraction of a sample.

* * * * *